United States Patent [11] 3,554,197

[72] Inventor Arthur Kenneth Dobbie
 London, England
[21] Appl. No. 746,360
[22] Filed July 22, 1968
[45] Patented Jan. 12, 1971
[73] Assignee Desoutter Brothers Limited
 London, England
 a British Company
[32] Priority Aug. 11, 1967
[33] Great Britain
[31] 37000/67

[54] PORTABLE POWER-OPERATED SAW
 5 Claims, 2 Drawing Figs.
[52] U.S. Cl. ............................................. 128/317,
 143/69, 74/47
[51] Int. Cl. ...................................................... A61b 17/14
[50] Field of Search ............................................. 143/69;
 30/(Inquired); 128/317, 310, 305, 92; 74/47

[56] References Cited
UNITED STATES PATENTS
 436,804 9/1890 Roberts .......................... 128/317X
1,763,730 6/1930 VonLackum .................. 128/317
3,365,963 1/1968 Happe ............................ 74/47

Primary Examiner—Donald R. Schran
Attorney—Holman, Glascock, Downing & Seebold

ABSTRACT: A portable power-operated saw comprising a blade with actuate teeth thereon which oscillates by means of a motor driving the blade and in which the output shaft of the motor rotates about an axis which cuts the axis about which the saw oscillates and the rotary motion of the motor is converted into the oscillating motion of the blade by a flat bladelike spring, one end of which is drivingly connected and parallel to the saw blade, while the other end of the spring is mounted by means of a spigot in a bearing on the output shaft of the motor and is eccentric therewith.

PATENTED JAN12 1971  3,554,197
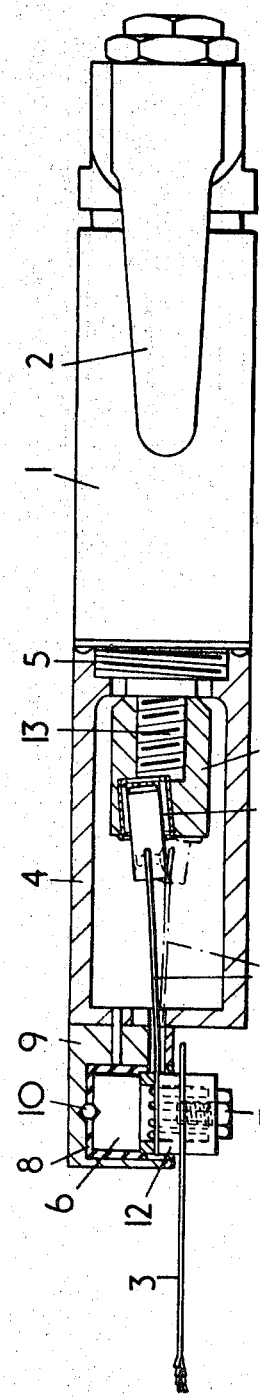
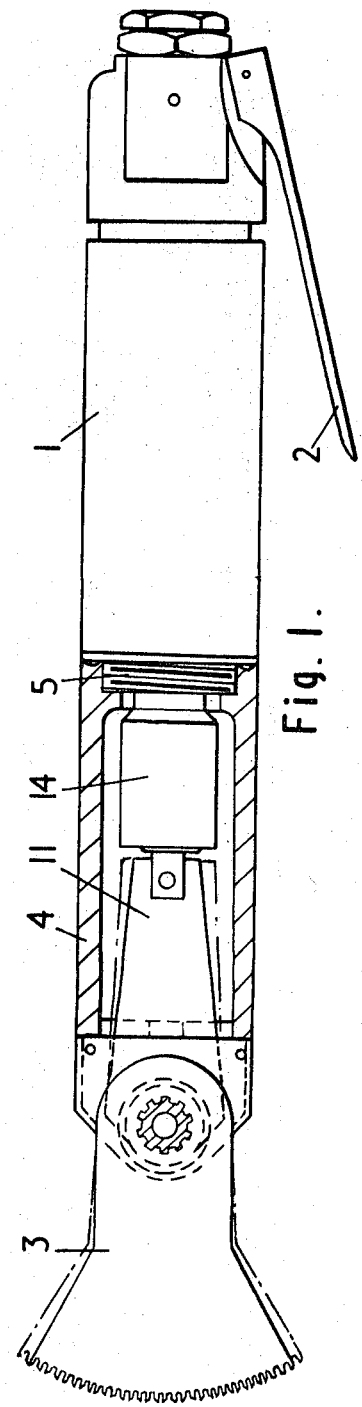
INVENTOR
ARTHUR KENNETH DOBBIE
BY Blanchard, Downing
& Seebold
ATTORNEYS

PORTABLE POWER-OPERATED SAW

The invention relates to portable power-operated oscillating saws, and in particular to a bone saw, in which the axis of rotation is at right angles to the spindle of the motor driving the saw.

The invention consists in a portable power-operated saw comprising a blade with teeth thereon arranged in a segment of a circle, and which in use oscillates about the center of the circle, and a motor for driving the blade, characterized in that the output shaft of the motor rotates about an axis which intersects the axis about which the saw oscillates, means being provided for converting the rotary motion of the motor into the oscillating motion of the blade, which means comprises a flat bladelike spring, one end of which is drivingly connected to the saw blade while the other end of the spring is mounted, by means of a spigot, in a bearing on the output shaft of the motor, the bearing being eccentric therewith.

The invention further consists in a power-operated saw as set forth in the preceding paragraph in which the saw blade and the first mentioned end of the spring are parallel to one another, while the axis of rotation of the spigot in the eccentric bearing passes through the axis of rotation of the saw in the plane of the spring at its first mentioned end where drivingly connected to the saw.

The invention still further consists in a power-operated saw as set forth above in which the saw blade is splined to a shaft which is at right angles to the driving shaft of the motor, and the axis of the motor shaft intersecting the axis of the shaft for the saw blade where the latter is attached to the former.

The invention still further consists in a power-operated saw as set forth in the preceding paragraph in which the saw blade, shaft of the saw and the blade like spring are mounted in a casing which is detachable from the casing for the motor.

The accompanying drawing shows, by way of example only, one embodiment of the invention in which:

FIG. 1 is a side elevation having a partial cross section in the plane parallel to the saw blade; while FIG. 2 is a side elevation having a partial cross section in a plane at right angles to the saw blade.

The saw comprises a cylindrical casing 1 which houses a motor, either electric or pneumatic, the latter being preferred due to its freedom from shock hazard, and its freedom from explosion hazard in the presence of flammable gas mixtures, and to its small size. The motor is operated by pressure upon a lever 2.

A saw blade 3, which has teeth arranged to cut in both directions of stroke, is mounted on a detachable portion 4 which is fastened to the casing 1 by a screw thread 5 upon each. The saw blade 3 is drivingly attached to a saw shaft 6, by means of splines, and is held in position by a hexagon headed screw 7. The shaft 6 is mounted flexibly in a silicone rubber or other suitable flexible material 8 within a cylindrical recess in a nose 9 of the tool which is part of portion 4, and is therefore free to rotate a limited extent in both directions. The shaft 6 is centered in the recess in the nose 9 by means of a ball 10.

Also drivingly attached to the shaft 6 is a flat bladelike spring 11 by means of a bush 12. Consequently, the saw 3 and the spring 11 can oscillate together about the axis of rotation of the shaft 6.

The axis of rotation of an output shaft 13 passes through the axis of the shaft 6 in the plane of the spring 11 where attached to the latter, and is provided with a boss 14 which houses a needle roller race 15 in a bore which is eccentric with respect to the axis of the shaft 13, and is inclined in relation thereto. The axis of the roller race 15 also passes through the axis of shaft 6 where the spring 11 is attached thereto.

The lower end of the spring 11 is provided with a hardened spigot which engages in the roller race 15, and in consequence, as the shaft 13 of the motor rotates the spigot describes a conical path, and due to the flexibility of the spring 11 in one plane, it imparts an oscillating motion to the saw shaft and saw. The race 15 and spigot may, alternatively, be of barrel shape or even spherical, to allow freedom for hinging movement of the end of the spigot in respect to the bearing.

By reason of the high speed of oscillation of the saw blade and its short stroke it is able to cut an object which is but lightly held, as for example a bone during bone surgery.

Furthermore, due to the limited arc of movement of the saw, the amount of clearance required during use is negligible.

It is to be understood that the above description is by way of example only, and that details for carrying the invention into effect may be varied without departing from the scope of the invention claimed.

I claim:

1. A portable power-operated saw having a blade with teeth thereon arranged in a segment of a circle, which teeth in use oscillate about the center of the circle, and a motor for driving the blade, the improvement comprising an output shaft of the motor which rotates about an axis which intersects the axis about which the saw oscillates; means for converting the rotary motion of the motor into the oscillating motion of the blade, which means comprises a flat bladelike spring, one end of which is drivingly connected to the saw blade by a shaft while the other end is mounted, by means of a spigot, in a bearing eccentrically mounted on the output shaft of the motor; said means for converting the rotary motion into oscillating motion being contained in a casing having a noselike portion including a recess; and one end of the saw shaft being mounted for restricted rotational movement in said recess by means of silicone rubber.

2. A power-operated saw as claimed in claim 1, in which the saw blade and said one end of the spring are parallel to one another, while the axis of rotation of the spigot mounted in the eccentric bearing passes through the axis of rotation of the saw where the spring is drivingly connected thereto.

3. A power-operated saw as claimed in claim 1, in which the saw blade is splined to the saw shaft which is at right angles to the driving shaft of the motor, and the axis of the motor shaft intersects the axis of the saw shaft.

4. A power-operated saw as claimed in claim 3, wherein said casing is detachable from a casing for the motor.

5. A power-operated saw as claimed in claim 1, in which said recess is cylindrical and contains a ball mounted on the axis of the cylinder between the end of the cylindrical recess and the end of the shaft to maintain the shaft coaxial with the cylindrical recess.